No. 669,068. Patented Mar. 5, 1901.
J. A. ARTHUR.
LEVELING INSTRUMENT.
(Application filed Apr. 10, 1900.)
(No Model.)
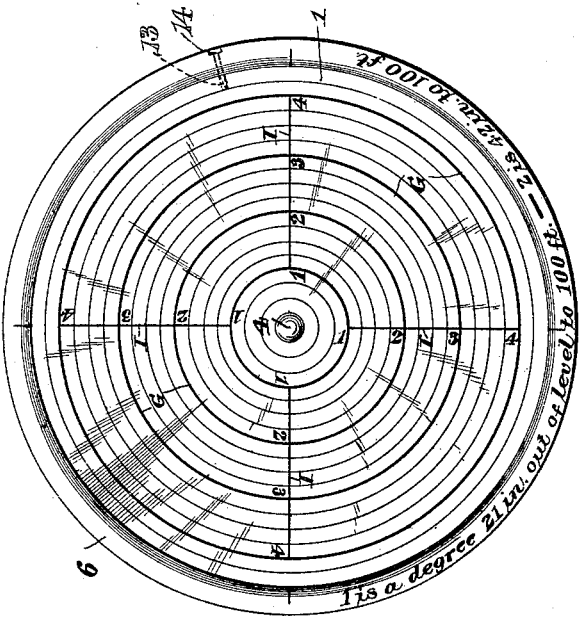
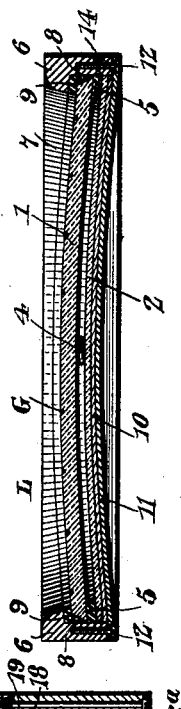
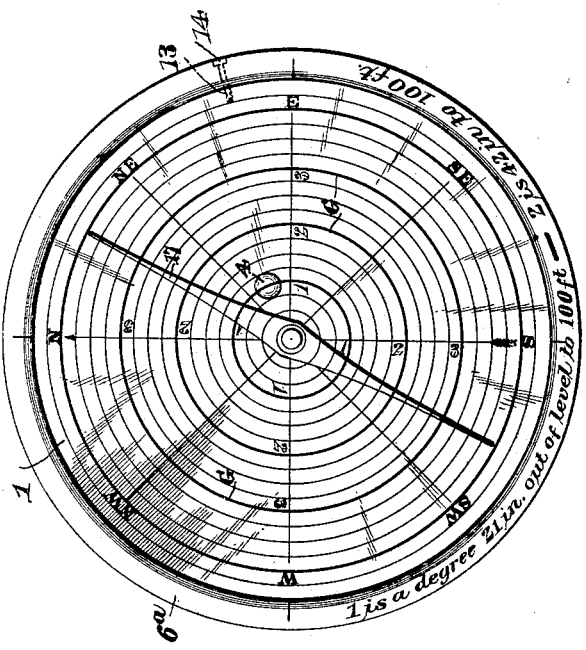
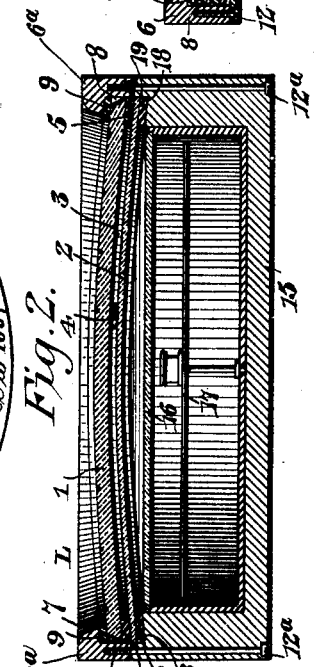
Joseph A. Arthur, Inventor

UNITED STATES PATENT OFFICE.

JOSEPH A. ARTHUR, OF WHEELING, WEST VIRGINIA, ASSIGNOR OF ONE-HALF TO D. E. STALNAKER, OF SAME PLACE.

LEVELING INSTRUMENT.

SPECIFICATION forming part of Letters Patent No. 669,068, dated March 5, 1901.

Application filed April 10, 1900. Serial No. 12,362. (No model.)

*To all whom it may concern:*

Be it known that I, JOSEPH A. ARTHUR, a citizen of the United States, residing at Wheeling, in the county of Ohio and State of West Virginia, have invented a new and useful Leveling Instrument, of which the following is a specification.

This invention relates to leveling instruments, and more especially to that type of instruments known as "spirit-levels;" and it has for its object to provide a new and useful device of this character having a wide range of use both as a simple level and for various other purposes—such, for instance, as in combination with a compass to provide a combination instrument well adapted for surveyors.

To this end the invention primarily contemplates a simple and efficient construction of spirit-level having the parts thereof so arranged and formed as to insure the movement of the indicating-bubble with perfect uniformity and also to insure the immediate stopping of the bubble when it reaches its highest level—namely, at the point of indication.

A further object of the invention is to associate with the level novel graduations, whereby the device may be utilized as a computing-level for carpenters and other uses in plotting out work and in determining the proper set or inclination of parts, thereby adapting the instrument to a wide range of use.

A further object of the invention is to construct the level in a form whereby it may be utilized not only as a computing-level and laying-out instrument, but also as a protractor and as a plumb.

Another and very important object of the invention is to utilize the level in a novel and practical manner in connection with a compass, thereby providing a combined leveling instrument and compass especially adapted for surveyors and for railroading purposes in leveling and straightening tracks and the like. In this adaptation of the invention a novel feature resides in the relation of the level to the compass, whereby the compass readings are viewable through the level, so that the latter will not interfere with the separate use of the compass, and vice versa.

With these and other objects in view, which will more readily appear as the nature of the invention is better understood, the same consists in the novel construction, combination, and arrangement of parts hereinafter more fully described, illustrated, and claimed.

The essential features of the invention, involving the specific formation of the level and its association with the compass, are necessarily susceptible to some modification without departing from the spirit or principle of the invention; but the preferred embodiment of the improvements is shown in the accompanying drawings, in which—

Figure 1 is a plan view of a combination leveling instrument and compass constructed in accordance with the present invention. Fig. 2 is a cross-sectional view of the construction shown in Fig. 1. Fig. 3 is a plan view of the simple form of the invention—that is, the leveling instrument *per se*. Fig. 4 is a sectional view of the leveling instrument *per se*, illustrated in Fig. 3.

Like characters of reference designate corresponding parts in the several figures of the drawings.

In all adaptations of the invention the specific construction of the level is the same, and inasmuch as this level may be utilized singly or in combination with a compass reference will be first made to the said level *per se*, as illustrated in Figs. 3 and 4 of the drawings.

The level essentially comprises a pair of transparent casing-plates 1 and 2, arranged in superposed relation and spaced apart to confine therebetween a fluid chamber or space 3, which is designed to accommodate a sufficient amount of the fluid or spirit to provide therein a floating globule 4, usually known as the "indicating-bubble," and in the present invention the indicating bubble or globule 4 has a free play throughout the entire area of the fluid chamber or space 3, confined between the two casing-plates 1 and 2 of the level. In carrying out the present invention it is desirable to have a fluid-tight joint at the peripheral edges of the plates 1 and 2, and to secure this result there is employed a joint-gasket 5, which is interposed between the two plates at or contiguous to the edges thereof, and at this point it is to be observed that the transparent level-casing, consisting of the plates 1 and 2, is constructed in the form of a segment of a globe or sphere, thereby necessitating the formation of the casing-plates 1 and 2 of circular concavo-convex disks arranged in spaced parallel relation. By reason of having the transparent level-casing 1 2, carrying the floating bubble or globule 4, in the form of a segment of a circle the bubble moves with perfect uniformity throughout the entire chamber or space 3 and will always immediately stop when it reaches its highest level—namely, at the point of indication. This action involves a decided advantage over the ordinary types of spirit-levels in which the bubble moves in a straight line when rising to its highest level, and in such levels the bubble invariably will pass beyond the point of indication before resuming a stationary position at the point of indication, thus causing a loss of time and sometimes inaccuracy of measurement, which is very objectionable.

While the transparent casing 1 2 is in the form of a segment, the same may also be properly termed as being "concavo-convex" in cross-section, and in the single form of the level when used *per se* independent of the compass or any other instrument the said casing, consisting of the plates 1 and 2 and the interposed joint-gasket 5, is held within a suitable frame, preferably in the circular frame-rim 6, having a flared opening 7 at the top and interiorly grooved or rabbeted, as at 8, to receive therein the peripheral edges of the plates 1 and 2. A packing-ring 9 is preferably interposed between the upper casing-plate 1 and the shoulder or base of the interior groove or rabbet 8. A packing-sheet 10 is also preferably placed beneath the lower casing-plate 2 and is held in place by the bottom cover plate or disk 11, detachably fastened by means of the screws 12 or other equivalent fasteners to the bottom frame-rim 6, thereby providing a simple and compact structure and also providing for tightly clamping the several elements of the level together and obviating the leakage of the fluid or spirit.

Inasmuch as the upper casing-plate 1 is the one exposed to handling, the same is preferably made of a thicker glass plate than the lower one, as plainly shown in Fig. 4 of the drawings, and in the carrying out of the invention in all forms thereof there is preferably associated with the level novel graduations, which indicate not only the direction in which an object or particular piece of work may be out of level, but also indicate to what extent the same is out of level. The graduations therefore make the instrument what may be properly termed a "computing and protracting level," and in the preferred embodiment of the graduations the same are preferably scored directly in one of the casing-plates, usually the exterior surface of the upper of said plates, as plainly shown in Fig. 4 of the drawings. These graduations (designated by the reference character G) are in the form of a series of concentric circular marks which range from the center of the level-casing to the peripheral edges thereof, thereby covering the entire field or area of movement of the indicating bubble or globule, so that at whatever point the said indicating bubble or globule may rest the plane thereof will be intersected by one of the graduations G, so that the person can immediately determine the inclination of the object to which the level may be applied. In the single form of the level when used *per se*, as shown in Fig. 4 of the drawings, it is preferable to associate with the graduations G straight indicating-lines I, extending in radial directions across the level-casing and intersecting the circular marks G, so that when the level is applied to an object the said lines I may be utilized to indicate the direction in which the same may be out of level. To facilitate the reading of the graduations, comprising the marks G and the straight lines I, suitable numbers or indicating-marks are placed adjacent to the graduations and lines, as indicated in Fig. 3 of the drawings, and a "key" is placed upon the frame-rim 6 in order that the readings may be interpreted at a glance.

As a simple spirit-level the device described is capable of every use of an ordinary level or plumb and in connection with the graduations thereof may be employed as a setting instrument for work, as well as for a computing-level for enabling a person to determine with accuracy and despatch the direction in which an object may be out of level, as well as the degree of inclination thereof.

To complete the construction of level described, the same is preferably provided with means for replenishing the fluid or spirit within the casing to supply any loss by evaporation which usually occurs in spirit-levels, with a consequent enlargement of the bubble or globule. It is desirable to have this bubble or globule of a medium size, and to insure this result the casing 1 and 2 is preferably provided with a refilling-opening 13, which pierces the joint-gasket 5 and is normally closed by the screw-plug 14, mounted in a threaded opening in the frame-rim 6 and having the point end thereof closing the said opening 13. By removing this screw 14 and placing the level on edge the resupplying of the fluid or spirit may be readily accomplished.

A very important use of the invention is in the association of the level with a compass to provide a combined leveling instrument and compass well adapted for the use of surveyors and in railroad-work. The preferred manner of combining the level with a compass is shown in Fig. 2 of the drawings, and referring particularly to this figure the numeral 15 designates a compass-box having the usual glass top 16 and a needle 17, playing over the usual compass-scale within the bottom of the box. This is an ordinary construction of box-compass, and therefore no special claim is made thereto; but in combining the two instruments the compass-box is preferably provided at the upper edge thereof with a peripheral seat 18, disposed outside of the plane of the glass top 16 and adapted to receive therein a seat-packing 19, which receives thereon the peripheral edge of the lower casing-plate 2 of the level, which level is designated in its entirety by the reference character L in both Figs. 2 and 4 of the drawings. The only change made in the level structure in applying the same to a compass, as shown in Fig. 2 of the drawings, is the necessity of omitting the packing-sheet 10 and bottom cover plate or disk 11 to permit of the casing 1 2 being clamped directly on top of the compass-box through the medium of the frame-rim 6$^a$ and the securing-screws 12$^a$, passing through the compass-box and engaging in the frame-rim 6. In other respects the construction of the level shown in Fig. 2 is precisely the same as that shown in Fig. 4, and a further specific description thereof therefore seems unnecessary; but at this point it should be observed that the flaring top opening 7 of the frame-rim is of a sufficient width to fully expose all of the compass readings within the compass, and therefore not interfere in the least with the use of the instrument solely as a compass, even with the level applied thereto as a part of the same.

One of the distinctive features of the combined instrument (shown in Fig. 2) is that the transparent level practically forms the inclosing top for the compass, so that the compass is viewable entirely through the level. This combination is capable of many important uses, especially in all work where it is necessary to accurately and quickly level the compass before using the latter. This is of importance in surveying and railroad work, and it will be observed that even though the level may be combined directly with the compass and used in connection therewith in some classes of work still the construction does not interfere with the separate and individual use of both the level and the compass irrespective of the fact of the same being joined together as a single instrument.

A further advantage of the combination of the level with the compass resides in the fact that the compass graduations or marks, which necessarily intersect the circular graduating-marks G, may be used as indicating-marks for indicating the direction in which an object is out of level when the combined device (shown in Fig. 2) is used as a level.

Many uses of the herein-described instrument in either its single form or when combined with a compass will readily suggest themselves without further description, and I will have it understood that various changes in the form, proportion, and minor details of construction may be resorted to without departing from the principle or sacrificing any of the advantages of this invention.

Having thus described the invention, what is claimed as new, and desired to be secured by Letters Patent, is—

1. In an instrument of the class described, a level consisting of a pair of superposed concavo-convex plates arranged in spaced parallel concentric relation, and confining therebetween a fluid chamber or space, substantially as set forth.

2. In an instrument of the class described, a level consisting of a circular fluid or spirit casing comprising a pair of superposed concavo-convex plates arranged in spaced parallel relation, the top plate being provided with a series of concentric circular graduations covering the entire field of movement of the indicating bubble or globule, substantially as set forth.

3. In an instrument of the class described, a level consisting of a fluid or spirit casing of a concavo-convex form in cross-section having an interior fluid chamber or space conforming to the cross-sectional contour of said casing, and a transparent top plate provided with a series of concentric circular graduating-marks covering the entire field of movement of the indicating bubble or globule, substantially as set forth.

4. In an instrument of the class described, the combination of a compass complete within its own housing, and a separate transparent level forming a top for the compass and exposing therethrough the compass readings, substantially as set forth.

5. In an instrument of the class described, the combination of the compass-box, containing the usual compass elements, and a separate transparent concavo-convex spirit-level clamped over the top of the compass and exposing therethrough the compass readings, substantially as set forth.

6. In an instrument of the class described, the combination of a compass-box containing the usual compass elements and provided with a glass top, a separate complete transparent spirit-level detachably fitting over the glass top of the compass-box, and means for separably holding the level upon the compass-box, substantially as set forth.

7. In an instrument of the class described, the combination of a compass, and a transparent spirit-level arranged over and covering the compass, said level being provided with a plurality of concentric graduations readable in connection with the compass-graduations which are exposed through the level, substantially as set forth.

In testimony that I claim the foregoing as my own I have hereto affixed my signature in the presence of two witnesses.

JOSEPH A. ARTHUR.

Witnesses:
JOHN H. SIGGERS,
FLORENCE E. WALTER.